(12) United States Patent
Rowe

(10) Patent No.: US 7,987,608 B2
(45) Date of Patent: Aug. 2, 2011

(54) GRINDING ANGLE BUBBLE LEVEL JIG

(76) Inventor: Frederick Rowe, Amesville, OH (US)

(*) Notice: Subject to any disclaimer, the term of this patent is extended or adjusted under 35 U.S.C. 154(b) by 190 days.

(21) Appl. No.: 12/504,101

(22) Filed: Jul. 16, 2009

(65) Prior Publication Data

US 2011/0010954 A1 Jan. 20, 2011

(51) Int. Cl.
*G01C 9/02* (2006.01)
*G01C 9/28* (2006.01)
*B23Q 17/22* (2006.01)

(52) U.S. Cl. .............. 33/370; 33/347; 451/371; 451/405

(58) Field of Classification Search ............... 33/301, 33/347, 370, 371, 372, 373; 451/45, 296, 451/369, 370, 371, 380, 405, 439; D10/69
See application file for complete search history.

(56) References Cited

U.S. PATENT DOCUMENTS

| | | | | |
|---|---|---|---|---|
| 352,721 A * | 11/1886 | Traut | ............................... | 33/371 |
| 2,304,625 A * | 12/1942 | Carlson | ........................... | 33/401 |
| 3,807,051 A * | 4/1974 | Funakubo | ....................... | 33/334 |
| 3,861,088 A * | 1/1975 | Grieco | ............................ | 451/380 |
| 3,950,899 A * | 4/1976 | Gilbert | ........................... | 451/370 |
| 4,457,078 A * | 7/1984 | Suchy | .............................. | 33/334 |
| 5,063,679 A * | 11/1991 | Schwandt | ........................ | 33/347 |
| 5,157,870 A * | 10/1992 | Pike | ................................. | 451/273 |
| 5,172,484 A * | 12/1992 | Triola | ............................. | 33/534 |
| 5,431,068 A * | 7/1995 | Alsch | ................................. | 76/82 |
| 5,582,542 A * | 12/1996 | Stein | ............................... | 451/367 |
| 5,810,649 A * | 9/1998 | Oar et al. | ....................... | 451/378 |
| 6,227,958 B1 * | 5/2001 | Neuberg | ........................ | 451/367 |
| 6,280,307 B1 * | 8/2001 | Lea | ................................. | 451/344 |
| 7,467,475 B1 * | 12/2008 | Cheek | .............................. | 33/379 |
| 2006/0057946 A1 * | 3/2006 | Evans | ............................... | 451/45 |
| 2008/0113588 A1 * | 5/2008 | Kelman et al. | ..................... | 451/9 |

FOREIGN PATENT DOCUMENTS

JP 2001124552 A * 5/2001
* cited by examiner

*Primary Examiner* — R. A. Smith
(74) *Attorney, Agent, or Firm* — James A. Italia; Italia IP

(57) ABSTRACT

Method of and apparatus for indexing a workpiece to a tool at a predetermined angle of orientation, using a bubble level to establish a horizontal reference plane. The bubble level may be pivotally fixed to a housing of a jig which may incorporate a magnet for adhering the housing to a magnetically responsive workpiece. The bubble level may be secured at a particular pivotal orientation such that when the workpiece is held against the cutting or abrading surface of a tool, the workpiece may be manually maintained at the predetermined angle of orientation such that a ground surface disposed at a predetermined angle on the workpiece may be formed while holding the workpiece manually. The jig may incorporate an adjustable leg to assist in tightening the bubble level at the particular pivotal orientation.

5 Claims, 6 Drawing Sheets

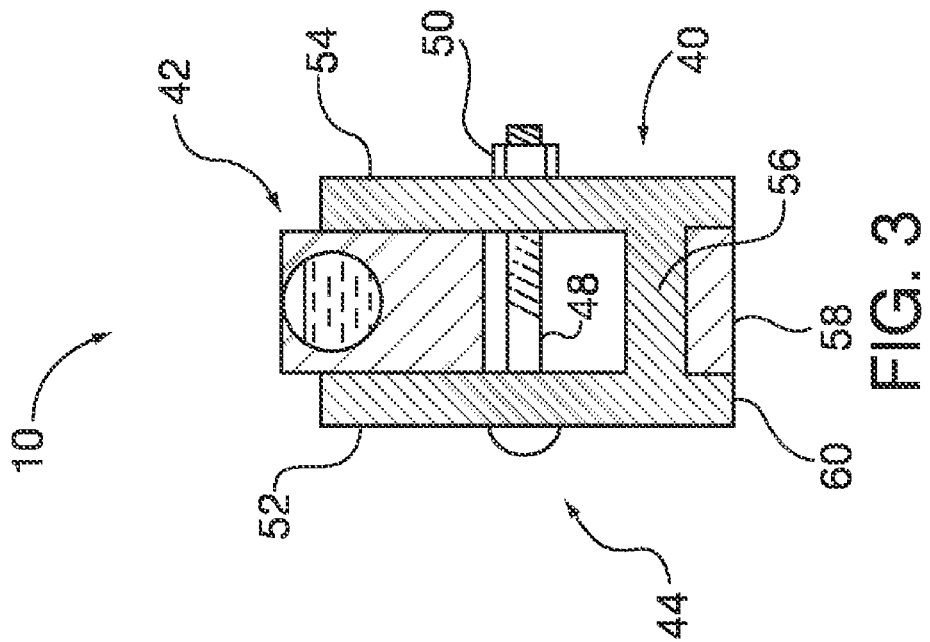
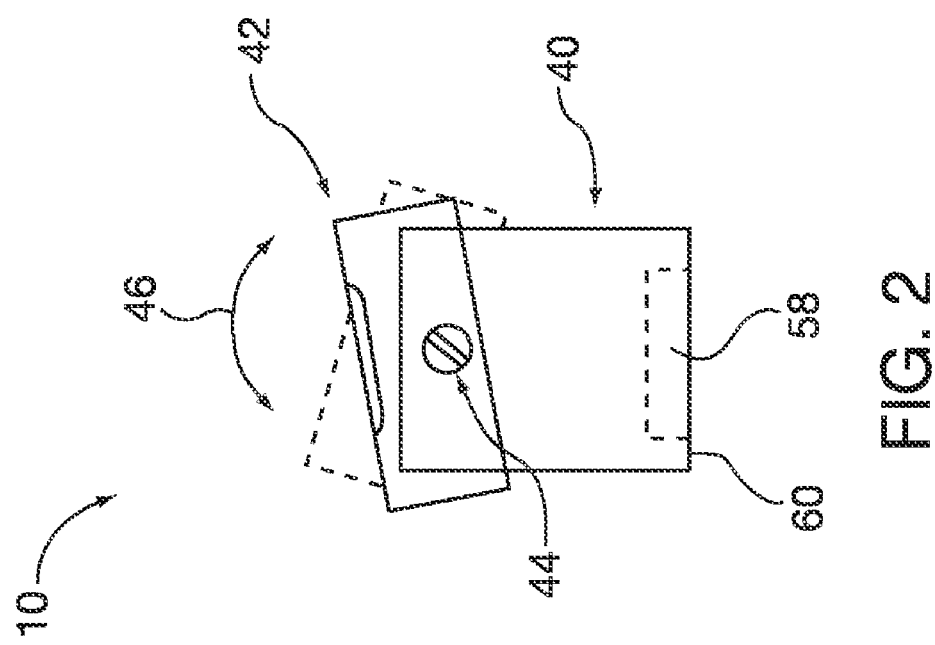

GRINDING ANGLE BUBBLE LEVEL JIG

FIELD OF THE INVENTION

The present invention pertains to jigs for determining relative angle of an object being abraded relative to a moving abrasive surface, and more particularly to a jig which fixes a bubble level to the object being abraded so that that object may be indexed to a horizontal reference plane.

BACKGROUND OF THE INVENTION

Craftsman who fabricate articles must from time to time grind beveled surfaces into workpieces. For example, crafters of knives may manually hold the tang of a knife against the moving surface of a grinding tool, such as a grinding belt. The tang of the knife may require being held at a particular angle, or at a reproducible angle so that the exact same bevel may be ground onto both sides of the final blade.

Experienced craftsmen who grind articles by hand can do a reasonably good job of setting the angle as desired. However, it takes many years to become sufficiently proficient as to be able to produce desired angles of bevels in this manner. Also, even an experienced craftsman may possibly lose control of the angle from time to time.

A particular situation when machine-like precision is desired is depicted in FIG. 6A. Grinding bevel surfaces 2, 4 into a blade blank 6 requires that both bevel surfaces 2, 4 be ground at the same angle A so as to result in a knife blade displaying bilateral symmetry. In FIG. 6A, the angle A is depicted as being that included angle spanning one of the bevel surfaces 2 or 4, and a plane 8 which bisects the blade bank 6 through the smallest dimension thereof. FIG. 6A illustrates the blade blank of a knife which may be produced by prior art methods.

FIG. 7 shows a prior art method of how the blade bank 6 may be ground by hand. The tang is held in the hand H of the operator against the belt 18 of a belt sanding or belt grinding machine 16. It will be appreciated that considerable skill, acuity, and experience are required of a human operator to keep the grinding angle constant, and further to keep the grinding angle equal to a predetermined desired angle. It is very difficult for a beginner to produce acceptable knives by hand grinding, and even for more experienced craftsmen to maintain a desired level of consistency in controlling angles of ground surfaces.

There exists a need in the prior art for an uncomplicated aid to assist in determining the exact angle of a workpiece which is to be held manually against the moving surface of a grinding tool.

SUMMARY OF THE INVENTION

The present invention provides a jig which enables a craftsman to discern at a glance the angle at which a hand held workpiece is held relative to the moving surface of a cutting or grinding tool. The jig incorporates a bubble or spirit level, which may be adjusted to a desired setting. Relying upon that setting enables the user to index the workpiece to a hypothetical horizontal reference plane rather than basing a reference plane on an operating power tool, and especially rather than basing the selected reference plane on the moving portion of the power tool.

BRIEF DESCRIPTION OF THE DRAWINGS

Similar reference characters denote corresponding features consistently throughout the attached drawings.

FIG. 2 is a side elevational view of the jig of FIG. 1.

FIG. 3 is an end elevational view of the jig of FIG. 1.

DETAILED DESCRIPTION

Figure 1:
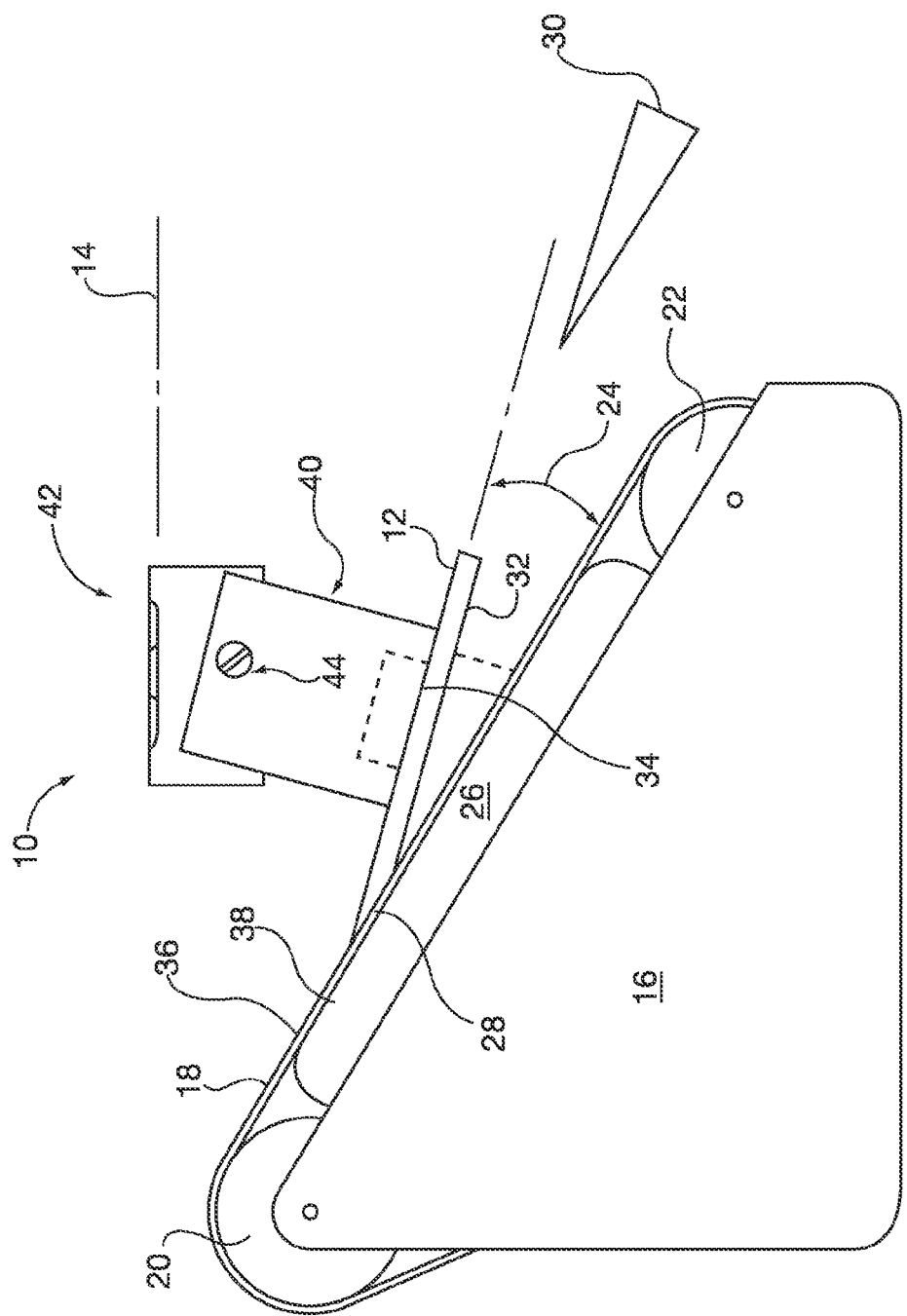
FIG. 1 is an environmental side view of a workpiece being held against a cutting tool at a selected angular relationship thereto, using a jig according to at least one aspect of the invention.

One implementation of the present invention is seen in FIG. 1 to comprise a jig 10 for indexing a hand held workpiece 12 to a horizontal direction 14 so that the workpiece 12 may be held at a predetermined angle to a tool. In the depiction of FIG. 1, the tool is a belt grinding machine 16 having an endless belt 18 which travels along a repeating path determined by pulleys 20, 22 and a third pulley which is concealed from view in FIG. 1. The nature of the tool is not critical to the invention, and therefore is shown only in representative capacity. It will be appreciated however that the present invention is most advantageous in situations wherein that surface of the tool which contacts the workpiece is disposed at a non-vertical, non-horizontal angle, as such angles are difficult to gauge by eye.

In the example of FIG. 1, the workpiece 12 is to be held at a predetermined angle 24 to the endless belt 18 at the point of contact between the workpiece 12 and the endless belt 18. At the point of contact, the endless belt 18, which ordinarily is bendable, remains planar as it is supported by an underlying platen 26. Therefore, maintaining the position shown in FIG. 1 will result in a flat, planar bevel surface being ground into the workpiece 12.

Figure 5:
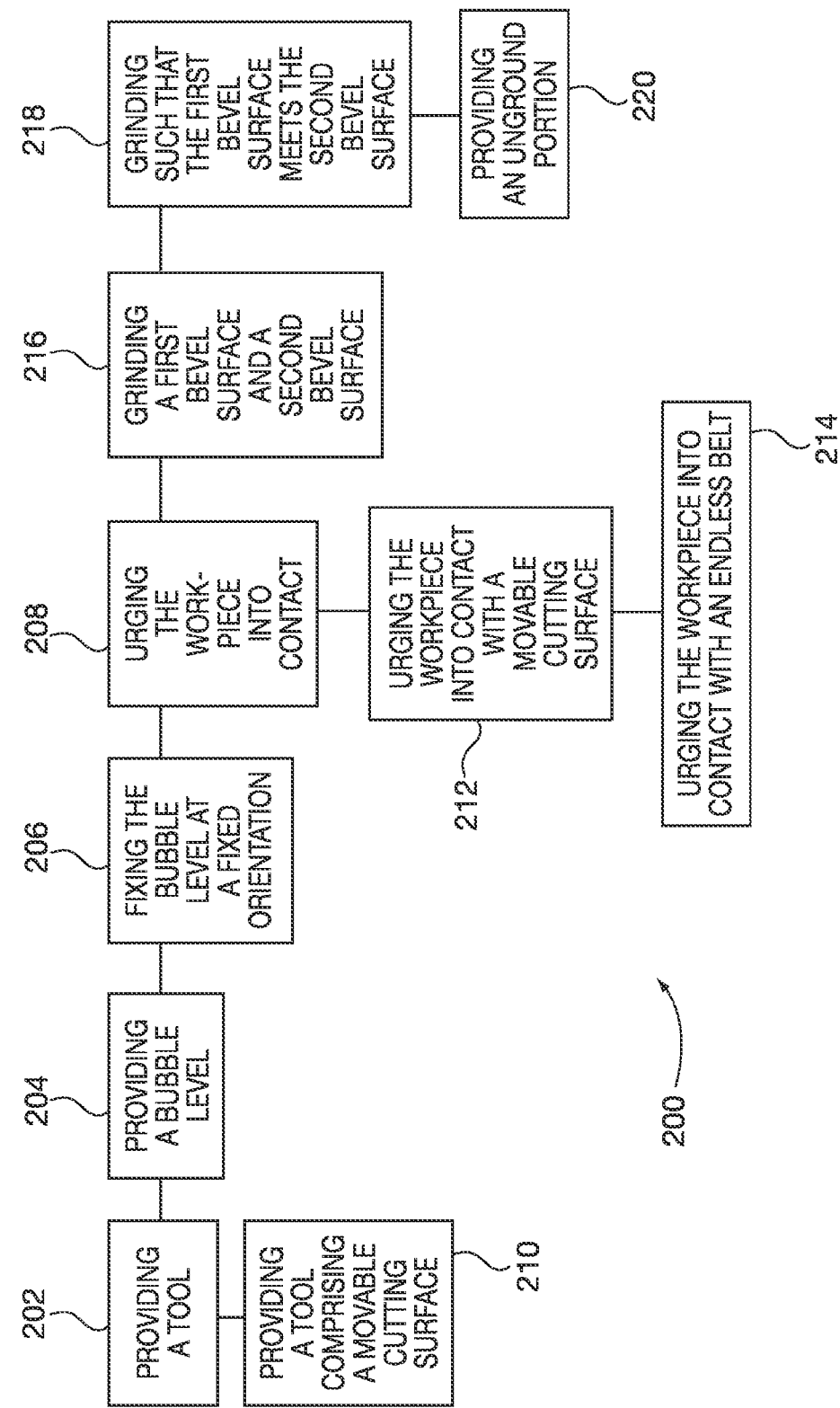
FIG. 5 is a block diagram of steps of performing a method according a further aspect of the invention, the steps being summarized in FIG. 5 rather than being fully set forth.

The problem being solved by the present invention is to assure that the angle of the bevel surface being ground into the workpiece 12 remain equal to the angle 24. This holds true both in cases wherein only one bevel surface is to be ground into the workpiece 12 and even more so when opposed bevel surfaces are to be ground into the workpiece 12, as shown in FIG. 5. Illustratively, the workpiece 12 may become a blade blank of a knife (not shown in final form), which is intended to bear opposed bevel surfaces as seen in FIG. 5.

Continuing to refer to FIG. 1, one way of assuring that the workpiece 12 reflect the angle 24 of that bevel surface 28 being ground may utilize the jig 10 and a shim in the form of a wedge 30. With the endless belt 18 at rest, the wedge 30 may be inserted between the bottom surface 32 of the workpiece 12 or the bottom surface 34 of the jig 10, and the opposed upwardly facing surface 36 of the endless belt 18 or the upwardly surface 38 of the platen 26 (with the endless belt 18 removed).

As employed herein, expressions incorporating orientational terms, such as "upwardly facing", "bottom surface", "lower surface", and others are used only for semantic convenience in explaining the workings of the present invention. The referenced orientations refer to those as depicted in the drawings. The apparatus of the invention and its environment are obviously capable of being held in different orientations. Therefore, orientational terms should not be construed in a limiting sense.

The jig 10 is then rested on the workpiece 12 or alternatively, directly onto the wedge 30. The jig 10 comprises a housing 40, a spirit or bubble level 42, and an adjustable clamp 44 disposed to hold the bubble level 42 at any one angle or orientation within a range of angles or orientations. This adjustment is shown in FIG. 2, wherein it will be seen that the bubble level 42 can move arcuately, as indicated by comparing the solid line showing of the bubble level 42 to the broken line showing in FIG. 2. The arcuate path, also indicated by an arrow 46, is determined by the clamp 44. As better seen in FIG. 3, the clamp 44 may comprise a threaded fastener such as a screw 48 and a nut 50, which are disposed selectively to tighten a clevis arrangement over the bubble level 42 and to release the clevis arrangement from the bubble level 42. The screw 48 may pass through holes (not shown) formed in a first wall 52 and a second wall 54 formed as part of the housing 40 of the jig 10. The first wall 52 and the second wall 54 collectively complete the clevis arrangement which also includes a base member 56 which spans and connects the first wall 52 and the second wall 54. The housing 40 has a slight degree of elasticity which enables the first wall 52 and the second wall 54 to bend slightly so as to vary the space included therebetween when the nut 50 is tightened onto and released from the screw 48. The bubble level 42 is surrounded by and closely received within the housing 40 so that even a limited degree of tightening of the nut 50 will exert a clamping action which immobilizes the bubble level 42 within the housing 40. The screw 48 then not only enables clamping action, but also provides the basis for pivoting or rotating the bubble level 42 through a vertical plane about a rotational axis to be movable to a range of positions within a range of positions.

Returning to FIG. 1, when the wedge 30 is inserted in place, the bubble level 42 is adjusted relative to the housing 40 so that the bubble indicates a horizontal orientation. The clamp 44 is then tightened, so as to selectively lock the bubble level 42 at the selected one of the plural angles or orientations.

The wedge 30 may then be removed, and grinding may proceed. The operator (not shown) may hold the workpiece 12 against the moving endless belt 18, paying close attention to the bubble level 42. The operator holds the workpiece 12 in a position such that throughout grinding, the bubble level 42 continuously indicates a level or horizontal orientation. The finished bevel surface 28 will then reflect the predetermined angle 24 which was based on the wedge 30.

Grinding of the bevel surface 28 may be regarded as complete. Should the operator desire to produce a workpiece as shown in FIG. 5, then the workpiece 12 may be reversed and subjected to a second grinding operation in mirror image orientation to that from the first grinding which has just been described. The second grinding operation and its preparation are similar to the first.

It should be mentioned at this point that the jig 10 may incorporate a workpiece connector disposed to hold the jig 10 to the workpiece 12 in a fixed orientation thereto. If the jig 10 is to be used with magnetically responsive workpieces, such as the workpiece 12, which is typically a steel alloy, then the workpiece connector may engage the workpiece 12 magnetically. The workpiece connector may comprise a magnet 58 which is fixed to the housing 40 within a recess at the bottom surface 60 of the housing 40 such that the magnet 58 will not protrude from the housing 40. Of course, it would be possible to arrange the bottom surface of the magnet 58 so that the bottom surface of the magnet 58 may establish the bottom surface of the housing 40 if desired.

Figure 4:
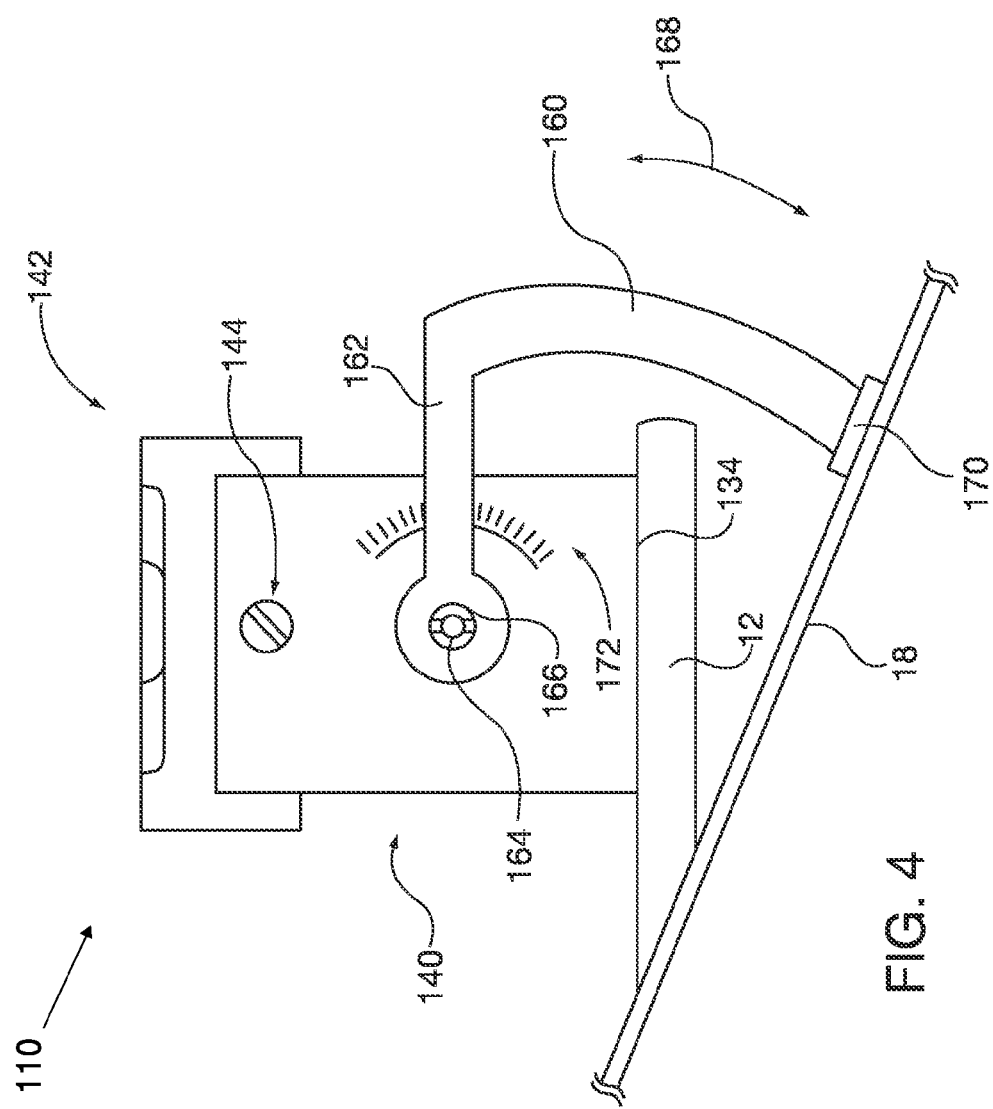
FIG. 4 is a side elevational view of a jig according to a further aspect of the invention.

FIG. 4 shows a jig 110 which incorporates an angle adjuster which is integrated thereinto, and which renders the wedge 30 of FIG. 1 unnecessary. The jig 110 may comprise a body 140 which is generally structurally and functionally similar to the body 40 of FIG. 1, a bubble level 142 which is generally structurally and functionally similar to the bubble level 42 of FIG. 1, and a clamp 144 which is generally structurally and functionally similar to the clamp 44 of FIG. 1. The jig 110 may comprise a leg 160 supported on a radius arm 162 from a pivot point anchored to the housing 140. The pivot point may comprise a threaded fastener 164 which may thread to a tapped hole (which is concealed by the head 166 of the threaded fastener 164 in FIG. 4). With the threaded fastener 164 slightly loosened, the leg 160 may be moved through an arcuate path indicated by the arrow 168 about a rotational axis established by the threaded fastener 164. When the bottom edge 170 of the leg 160 contacts a supporting surface (seen in FIG. 4 as the endless belt 18, but which of course could alternatively be the upper surface of the platen 26), the threaded fastener 164 may be tightened so as to clamp the radius arm 162 and the leg 160 into the selected position.

As this adjustment is being performed, it will be appreciated that the housing makes contact with a first environmental surface which may comprise the workpiece 12, contact being between the bottom surface 134 of the jig 110 and the upper surface of the workpiece 12. The leg 160 is brought into contact with a second environmental surface, such as the upwardly facing surface of the endless belt 18 (or alternatively, the upper surface of the platen 26 should the endless belt 18 be removed). The leg 160 may be said to adjustably engage the second environmental surface in that the leg 160 is pivotally adjustable to move throughout its arcuate path, and can thereby cause its bottom surface 170 to seat flushly against the second environmental surface. Adjustment of the leg 160 and tightening of the threaded fastener 164 will then maintain the housing 140 at a predetermined angle to the workpiece 12 and to maintain the workpiece 12 at a predetermined angle to the second environmental surface when the workpiece 12 is held by the jig 110 during grinding operations.

The housing 140 may bear measurement indicia disposed to indicate magnitude of the angle at which the leg 160 of the angle adjuster is oriented to the housing 140. This measurement indicia may take the form of a graduated scale 172 comprising a series of short lines.

The invention may be thought of as a method, seen as a method 200 shown in abbreviated form in FIG. 5, of indexing a hand held workpiece, such as the workpiece 12, to a horizontal reference plane so that the workpiece may be held at a predetermined angle to a tool, such as the grinding machine 16, without depending upon contact with the tool at more than one point of contact therewith. The method 200 may comprise a step 202 of providing a tool which is fixed in its orientation to its physical environment. This step refers to tools which are not hand held or body worn, but which rest on a generally stable environmental supporting surface, such as the floor of a building or a work table (neither shown), and which, apart from incidental motions such as vibrations, do not move relative to the environmental supporting surface. Illustratively, the belt grinding machine 16 is ordinarily mounted on a table, bench, or other environmental surface (not shown).

The method 200 may comprise a step 204 of providing a bubble level such as the bubble level 42.

The method 200 may comprise a further step 206 of fixing the bubble level at a set orientation to the workpiece at a critical angle to the workpiece such that when the bubble level indicates a level, horizontal orientation, the workpiece is oriented at the predetermined angle to the tool. This step reflects for example the procedure described priorly with reference to FIG. 1.

The method 200 may comprise a further step 208 of urging the workpiece into contact with the tool at one point of contact while maintaining the bubble level at the set orientation at which the bubble level indicates the level, horizontal orientation. Again, this step is seen in the procedure used with the apparatus of FIG. 1.

The step 202 of providing a tool may comprise a further step 210 of providing a cutting tool comprising a movable cutting surface. Although the belt grinding machine 16 exemplifies a cutting tool comprising a movable cutting surface, it should be understood that other tools such as for example a grinding wheel (not shown) provide movable cutting surfaces other than sanding belts.

The step 208 of urging the workpiece into contact with the tool may comprise the further step 212 of urging the workpiece into contact with the movable cutting surface when the movable cutting surface is moving. This step 212 applies to tools of all types which have rotatable, reciprocating, or traveling cutting and abrading elements. However, where the tool is specifically a belt sander such as the belt grinding machine 16, the step 212 may comprise the further step 214 of moving the workpiece into contact with the endless abrading belt when the endless abrading belt is moving. This step is seen in the procedure described with reference to FIG. 1.

The method 200 has thus far resulted in grinding a first bevel surface into a workpiece. The workpiece, such as the workpiece 12, may be reversed to present an unbeveled surface, and the steps 202 . . . 214 may be repeated to grind a second bevel surface into the workpiece. This situation may be reflected as a step 216.

Some projects which may utilize the method 12 may be other than the procedure of producing a sharp edged blade. For procedures intended to produce a sharp edged blade, the step 216 may comprise a further step 218 of grinding the second bevel surface such that the first bevel surface and the second bevel surface meet along a common line of contact, thereby establishing a sharp cutting edge.

Figure 6B:
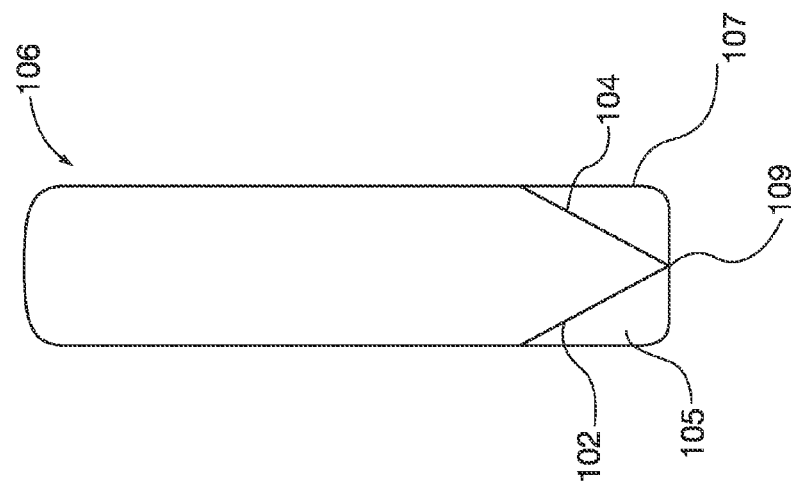
FIG. 6B is an end elevational view of a workpiece which may illustrate a product of the present invention.
Figure 6A:
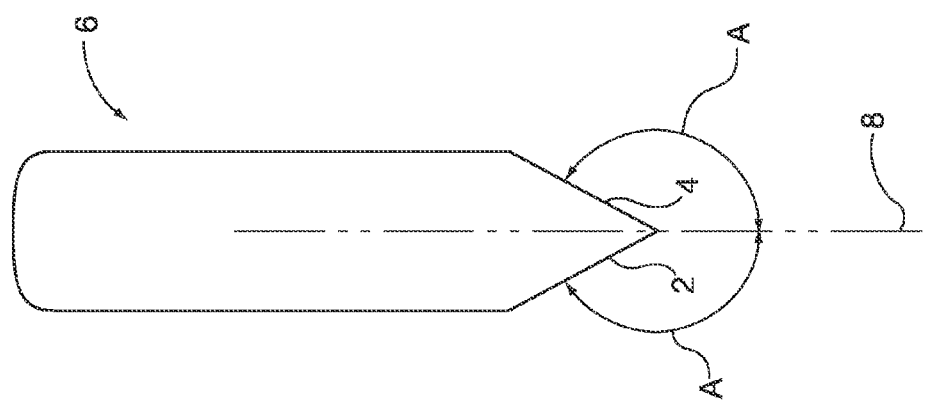
FIG. 6A is an end elevational view of a prior art workpiece.
Figure 7:
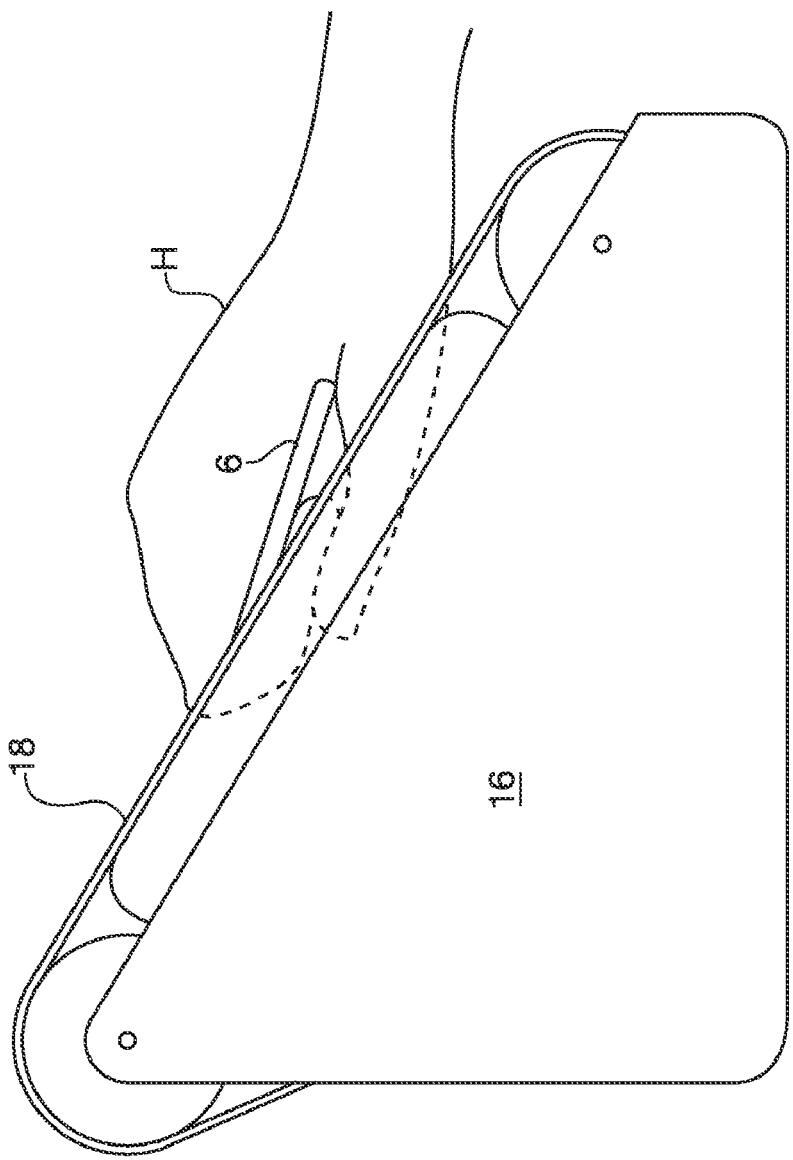
FIG. 7 is a side elevational view of a prior art method of grinding a bevel into a workpiece by hand.

The product of the step 218 will be similar to a tang 106 shown in FIG. 6B. In FIG. 6B, the tang 106 has been ground such that a first bevel edge 102 meets a second bevel edge 104 at a sharp cutting edge 109. The tang 106 has been ground along only a portion of what is seen as its lateral edges 106A, 106B such that the first bevel edge 102 and the second bevel edge 104 account for less than the full length of the tang 106. Unground portions 105, 107 of the tang 106 are visible in FIG. 6B. That unground part of the tang 106 bearing these unground portions 105, 107 projects in linear alignment with respect to that part of the tang 106 bearing the sharpened edge 109.

The tang 106 may form a finished knife having an unsharpened tang portion or alternatively may form the foundation of a knife (not shown in its entirety) having an unsharpened tang portion which may be completed for example by fixing a suitable handle (not shown) to that part of the tang 106 bearing the unground portions 105, 107. The invention may be regarded in one aspect as a knife comprising the tang 106.

Returning to FIG. 5, the method 200 may therefore comprise a further step 220 of providing an unground portion of the workpiece projecting in alignment with the sharp cutting edge, whereby the workpiece may serve as a knife having an unsharpened tang portion.

The invention may also be thought of as being a knife fabricated at least in part by a method using any or all of the steps described herein.

It will be appreciated that the novel method may incorporate any of the steps presented herein, and may be practiced in any feasible order of these steps.

It will be appreciated that while the present discussion has focused heavily on knives, other articles may be ground or abraded using the novel method and apparatus. Any workpiece that must have even one bevel surface ground thereinto may use the invention. It will further be appreciated that not only flat or planar surfaces can be formed using the invention. It would be possible to grind a conical or frustoconical end surface onto a rod using the invention by rotating the rod as the rod is urged into contact with a cutting surface such as the endless belt 18.

While the present has been described in connection with what is considered the most practical and preferred embodiments, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

What is claimed is:

1. A jig for indexing a hand held workpiece to a horizontal direction so that the workpiece may be held at a predetermined angle to a tool, comprising:
   a bubble level;
   a housing having an adjustable clamp disposed to hold the bubble level at any one of a range of plural orientations on the housing, and to selectively lock the bubble level at a selected one of the plural orientations, wherein the housing engages the workpiece at a first environmental surface, further comprising an angle adjuster disposed to adjustably engage a second environmental surface so as to maintain the housing at a predetermined angle to the workpiece and to maintain the workpiece at a predetermined angle to the second environmental surface when the workpiece is held by the jig; and,
   a workpiece connector disposed to hold said jig to the hand held workpiece in a fixed orientation to the hand held workpiece.

2. The jig of claim 1, further comprising measurement indicia disposed to indicate magnitude of the angle at which the angle adjuster is oriented to the housing.

3. A method of indexing a hand held workpiece to a horizontal reference plane so that the workpiece may be held at a predetermined angle to a tool without depending upon contact with the tool at more than one point of contact therewith, comprising the steps of:
   providing a tool which is fixed in its orientation to its physical environment;
   providing a bubble level;
   fixing the bubble level at a set orientation to the workpiece at a critical angle to the workpiece such that when the bubble level indicates a level, horizontal orientation, the workpiece is oriented at the predetermined angle to the tool;
   urging the workpiece into contact with the tool at one point of contact while maintaining the bubble level at the set orientation at which the bubble level indicates the level, horizontal orientation;
   grinding a first bevel surface into the workpiece and then grinding a second bevel surface into the workpiece; and,
   grinding the second bevel surface such that the first bevel surface and the second bevel surface meet along a common line of contact, thereby establishing a sharp cutting edge.

4. The method of claim 3, comprising the further step of providing an unground portion of the workpiece projecting in alignment with the sharp cutting edge, whereby the workpiece may serve as a knife having an unsharpened tang portion.

5. A knife fabricated at least in part by the method of claim 4.

* * * * *